United States Patent Office 3,538,790
Patented Nov. 10, 1970

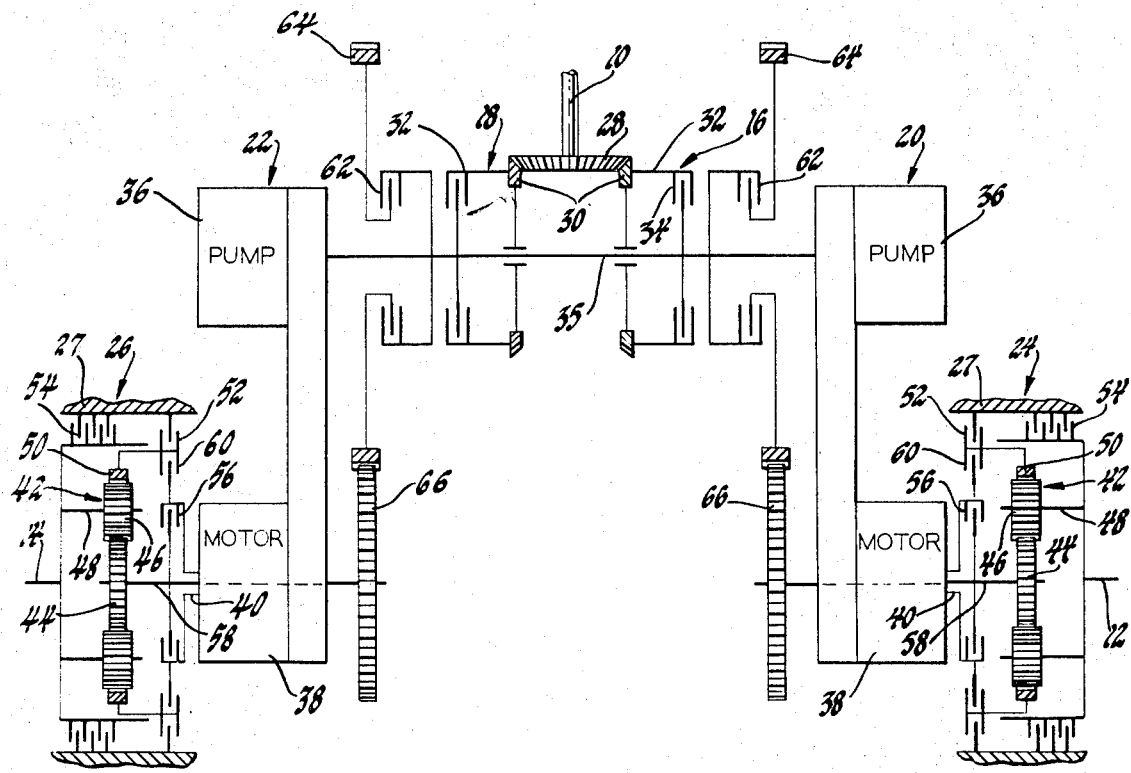

3,538,790
POWER TRAIN
James C. Polak, Indianapolis, Ind., assignor to General Motors Corporation, Detroit, Mich., a corporation of Delaware
Filed Oct. 2, 1968, Ser. No. 764,396
Int. Cl. B60k 19/00; F16h 47/04
U.S. Cl. 74—720.5
8 Claims

ABSTRACT OF THE DISCLOSURE

A power train is shown having a variable ratio hydrostatic drive unit driven by the power train's input shaft. A drive establishing-power combining planetary gear unit is connected to drive the power train's output shaft and is operatively connected to be selectively driven singularly through one power input member by the hydrostatic drive unit and simultaneously driven through this same power input member by the input shaft and another power input member by the hydrostatic drive unit to provide a low and high drive range, respectively. This arrangement provides full hydrostatic drive in the low drive range and hydrostatic-mechanical drive in the high drive range. For use in track-laying vehicles, the power train is shown having two of the above drive train arrangements combined to provide two separate output drives which are driven in the same direction at the same speed for straight ahead vehicle drive and driven at differential speeds for steering operation through control of the hydrostatic drive units.

This invention relates to power trains and more particularly to a single input, single and dual output power train providing full hydrostatic drive and hydromechanical drive.

The invention is illustrated in a power train for a track-laying vehicle and comprises an input shaft which is connected to drive the pump of a variable ratio hydrostatic drive unit in each of two drive trains through a forward and reverse drive. In each drive train, both the forward and reverse input drive and the motor of the hydrostatic drive unit are connectible to a drive establishing-power combining planetary gear unit which is connected to drive one of the two output shafts of the power train.

For the first and lowest drive range in forward or reverse, depending upon the direction of vehicle travel desired, a reaction-input member in the planetary gear unit of each drive train is braked for reaction and the motor in each drive train is connected to drive an input member of the planetary gear unit. The hydrostatic drive units in the drive trains provide for driving the output shafts at the same speed and in the same direction with infinitely variable speed ratio drive. The second and highest drive range is established by releasing the reaction-input member in the planetary gear unit of each drive train and clutching it to the associated motor while the input member of the planetary gear unit previously driven by the motor is now clutched to receive drive from the input shaft. The hydrostatic drive units again provide for driving the output shafts at the same speed and in the same direction with infinitely variable speed ratio drive but in a higher speed range. In addition, the hydrostatic units are operable to establish a differential speed between the two output shafts in each drive range to provide steer bias for steering the vehicle. Another feature of each drive arrangement is that the brake and clutches are speed synchronized at optimum shift points. For single output drive applications, only one of the two like drive trains is used.

An object of the present invention is to provide in a new and improved single input, single output power train providing full hydrostatic drive and hydromechanical drive.

Another object is to provide a new and improved single input, dual output power train providing full hydrostatic drive, hydromechanical drive and hydrostatic steering operation.

Another object is to provide in a power train, full hydrostatic drive in one drive range by one input power path to a drive establishing-power combining gear unit and hydromechanical drive in another drive range by mechanical input through this one power input path to the gear unit and hydrostatic drive by another power input path to the gear unit.

Another object is to provide a power train having full hydrostatic drive and also a combined hydrostatic and mechanical drive with speed synchronized range shifts and with the hydrostatic drive driving one member of planetary gearing for the full hydrostatic drive and the power train input driving this same member in the high drive range and the hydrostatic drive driving another member of the planetary gearing for the combined hydrostatic and mechanical drive.

These and other objects of the present invention will be more apparent from the following description and drawing which diagrammatically shows the power train according to the present invention.

The invention is illustrated for use in a track-laying vehicle with the power train generally comprising an input shaft 10 operatively connected to drive a right and left track powering output shaft 12, 14, respectively, by a common forward drive clutch unit 16, a common reverse drive clutch unit 18, a right and left variable ratio hydrostatic drive unit 20, 22, respectively, and a right and left drive establishing-power combining planetary gear unit 24, 26, respectively. The axis of input shaft 10 is arranged longitudinal of the vehicle to provide what is referred to as a T input drive for the power train which has the central axis of each component 12, 14, 16, 18, 20, 22, 24, 26, arranged transverse of the vehicle, output shafts 12 and 14 being axially aligned. All of the power train components are housed in a housing 27.

Since there are similar drive train arrangements for the drive to the output shafts 12 and 14 in which the drive clutch units 16 and 18 are similar, the hydrostatic drive units 20 and 22 are similar and the drive establishing-power combining planetary gear units 24 and 26 are similar, the following description of the components in one of these arrangements applies to the similar components in the other arrangement. Input to both the hydrostatic drive units and the drive establishing-power combining gear units is provided by input shaft 10 being connected to drive a bevel gear 28 which meshes with a pair of opposed bevel gears 30, the axes of gear 28 and gears 30 being at right angles. Each gear 30 is connected to the clutch drum 32 of one drive clutch unit so that engagement of a directional drive clutch 34 in the forward drive clutch unit 16 rotates a cross-shaft 35 in one direction and engagement of the other directional drive clutch 34 in the reverse drive clutch unit 18 rotates the cross-shaft 35 in the opposite direction. The cross-shaft 35 is connected to the hydrostatic pump 36 of each hydrostatic drive unit which pump is operatively connected hydraulically to its associated hydrostatic motor 38. Each hydrostatic drive unit is of conventional design with the pump having an infinitely variable displacement and the motor having a fixed displacement, the speed and direction of the motor's output shaft 40 which is a sleeve shaft being controlled by the pump's displacement. It will be understood that with the variable displacement pump 36, the output motor speed from zero to a maximum positive speed in one direction and a maximum negative speed in the other direction is obtained with constant power output on controlling displacement of the pump while pump input speed remains constant.

Each drive establishing-power combining planetary gear unit has a planetary gear set 42 having a sun gear 44 which meshes with a plurality of pinions 46 carried on a carrier 48 which is connected to the associated output shaft. The pinions 46 mesh with a ring gear 50 which is held on engagement of a low drive brake 52. Braking for each output shaft is provided by a vehicle brake 54 which, on engagement, brakes the associated output shaft through the carrier connection. Hydrostatic drive to one power input member of each planetary gear set is provided by engagement of a low drive clutch 56 which connects the motor's output shaft 40 via a shaft 58 to the sun gear 44. Alternatively, hydrostatic drive to another power input member of each planetary gear set is provided by engagement of a high drive clutch 60 which connects the motor's output shaft 40 to the ring gear 50. Mechanical drive to the power input member provided by sun gear 44 in each planetary gear set is provided by engagement of a high drive clutch 62 which connects the cross-shaft 35 to an annular spur gear 64. Gear 64 meshes with a spur gear 66 which is connected by shaft 58 to the sun gear 44, shaft 58 extending freely through the center of motor 38 and its sleeve shaft 40.

The clutches and brakes are of a conventional friction plate type and may be actuated in any known way, e.g., electrically, hydraulically, pneumatically or by some mechanical provision and in a certain sequence. Their preferred sequence of operation and the preferred operation of the hydrostatic drive units are described in the following illustrative operational summary.

The power train shown may be operated to provide the same two drive ranges in forward and reverse, the lowest drive being a full hydrostatic drive and the high drive being a hydrostatic-mechanical or hydromechanical type drive. For neutral, either the forward or reverse directional drive clutch 34 in clutch units 16 and 18 may be engaged and all other drive establishing devices are disengaged, thus, in neutral the hydrostatic pumps 36 are motored by the input shaft 10 through cross-shaft 35 without transferring power to the output shafts 12 and 14 and are available for both steering and subsequent establishment of the drive ranges as described later.

In the low drive range, either the forward drive clutch unit 16 or the reverse drive clutch unit 18 is engaged, both the low drive brakes 52 are engaged to hold the ring gears 50 and both the low drive clutches 56 are engaged to connect the hydrostatic motors 38 to drive the sun gears 44. The hydrostatic pumps 36 are then simultaneously controlled by increasing their displacement from zero to drive the sun gears 44 in the same direction and at the same speed from zero to maximum motor speed. With the sun gears 44 driven in one direction and the ring gears 50 held, the carriers 48 and thus output shafts 12 and 14 are caused to rotate in the same direction at the same reduced speed with the full hydrostatic drives thus provided.

At maximum motor speed in the low drive range, the driven element of each disengaged high drive clutch 62 is caused to rotate at the same speed and in the same direction as the driving clutch element of this clutch by the former element's gear drive with sun gear 44. Thus, at the maximum motor speed in the low drive range, the high drive clutches 62 for the mechanical power paths are speed synchronized for an upshift to the high drive range and are preferably engaged at this time. To complete establishment of the high drive range, the motor drives to the sun gears 44 are then released. Simultaneously, the displacement of the pumps 36 is reduced to zero and thus the output speeds of the motors are reduced to zero. Then, the low drive brakes 52 are released and the high drive clutches 60 for the hydraulic power paths whose driving and driven element are then both stationary are engaged to connect the motors 38 to the ring gears 50 with the reaction for the all mechanical drives thus taken by the motors with the pumps 36 at zero displacement. Subsequent increase in speed of the output shafts 12 and 14 in the high drive range is accomplished with hydromechanical drive by increasing the displacements of the pumps 36 to cause the motors 38 to add increasing speed drive to the ring gears 50 of the combined planetary gear set. Speed synchronization in the devices to be engaged for a downshift to the low drive is obtained by reversing the above operation.

Steering in neutral with either of the directional drive clutches engaged, and in both the low and high drive ranges in forward and reverse is accomplished by either independent control of the displacement of one of the pumps 36 to increase or decrease the speed of one of the output shafts 12 and 14 or by simultaneous control of the displacement of both pumps 36 to increase the speed of one output shaft and correspondingly decrease the speed of the other output shaft. The differential output shaft speed effected provides capabilities of turn at any speed within the vehicle's capabilities for negotiating turns and provides true pivot steer about the vehicle's center when desired, which would occur when the output shafts are driven in opposite directions at the same speed. The same power train operation is provided in both forward and reverse since the directional drive clutches 34 input to both the hydrostatic and mechanical power paths in the two drive train arrangements which provide drive to the output shafts 12 and 14. This provides the power train with what is commonly called full reverse operation.

It will also be appreciated that while the power train has been shown as being adapted for use in a track-laying vehicle, i.e., providing dual output, the power train according to this invention may also be employed in other types of vehicles by using only one of the two drive train arrangements shown. For example, the drive train arrangement between input shaft 10 (or cross-shaft 35) and output shaft 12 is suitable for use in wheel drive vehicles of both the truck and passenger car type. With the directional clutch drive included, the full reversing operation is retained. With the arrangement just from cross-shaft 35 and thus this shaft providing only a single direction input, the low drive and high drive are retained in one drive direction and drive in reverse is provided by reversing the pump displacement in this low drive.

The above described preferred embodiment is illustrative of the invention which may be modified within the scope of the appended claims.

I claim:

1. In a power train, the combination of an input shaft; an output shaft; variable ratio hydrostatic drive means operatively connected to be driven by said input shaft; and drive establishing-power combining means including reaction means, a pair of power input members and a power output member operatively connected to drive said output shaft through said power output member and operatively connected to be selectively driven singularly through one power input member by said hydrostatic drive means with operation of said reaction means and driven simultaneously through said one power input member by said input shaft and another power input member by said hydrostatic drive means.

2. The power train set forth in claim 1 and said drive establishing-power combining means comprising a planetary gear set having a carrier carrying a pinion and providing said power output member, a sun gear meshing with said pinion and providing said one power input member, a ring gear meshing with said pinion and providing said other power input member.

3. The power train set forth in claim 1 and directional drive means between said input shaft and both said hydrostatic drive means and said one power input member for selectively providing a forward drive and a reverse drive to both said hydrostatic drive means and said one power input member.

4. In a power train, the combination of an input shaft; a pair of output shafts; separate drive train means operatively drivingly connecting said input shaft to said output shafts; each said drive train means comprising variable ratio hydrostatic drive means and drive establishing-power combining means; each said hydrostatic drive means operatively connected to be driven by said input shaft; each said drive establishing-power combining means including reaction means, a pair of power input members and a power output member operatively connected to drive one output shaft through said power output member and operatively connected to be selectively driven singularly through one power input member by said hydrostatic drive means with operation of said reaction means and driven simultaneously through said one power input member by said input shaft and another power input member by said hydrostatic drive means.

5. The power train set forth in claim 4 and each said drive establishing-power combining means comprising a planetary gear set having a carrier carrying a pinion and providing said power output member, a sun gear meshing with said pinion and providing said one power input member, a ring gear meshing with said pinion and providing said other power input member.

6. The power train set forth in claim 4 and directional drive means between said input shaft and both said hydrostatic drive means and said one power input member in both said drive train means for selectively providing a forward drive and a reverse drive to both said hydrostatic drive means and said one power input member in both said drive train means.

7. In a power train, the combination of an input shaft; an output shaft; variable ratio hydrostatic drive means operatively connected to be driven by said input shaft; drive establishing-power combining means including a pair of power input members and a power output member operatively connected to drive said output shaft through said power output member and operatively connected to be selectively driven singularly through one power input member by said hydrostatic drive means and driven simultaneously through said one power input member by said input shaft and another power input member by said hydrostatic drive means; a clutch for connecting said hydrostatic drive means to drive said one power input member; a brake for braking said other input member; a clutch for connecting said hydrostatic drive means to drive said other power input member; and a clutch for connecting said input shaft to drive said one power input member.

8. In a power train, the combination of an input shaft; a pair of output shafts; separate drive train means operatively drivingly connecting said input shaft to said output shafts; each said drive train means comprising variable ratio hydrostatic drive means and drive establishing-power combining means; each said hydrostatic drive means operatively connected to be driven by said input shaft; each said drive establishing-power combining means including a pair of power input members and a power output member operatively connected to drive one output shaft through said power output member and operatively connected to be selectively driven singularly through one power input member by said hydrostatic drive means and driven simultaneously through said one power input member by said input shaft and another power input member by said hydrostatic drive means; and each said drive train means further comprising a clutch for connecting said hydrostatic drive means to drive said one power input member, a brake for braking said other power input member, a clutch for connecting said hydrostatic drive means to drive said other power input member, and a clutch for connecting said input shaft to drive said one power input member.

References Cited
UNITED STATES PATENTS

| | | | |
|---|---|---|---|
| 2,272,934 | 2/1942 | Cotal | 74—720.5 |
| 2,580,946 | 1/1952 | Orshansky et al. | 74—720.5 X |
| 3,122,025 | 2/1964 | Mark et al. | 74—687 X |
| 3,306,129 | 2/1967 | De Lalio | 74—687 |
| 3,383,952 | 5/1968 | Christenson | 74—720.5 |
| 3,427,899 | 2/1969 | Gunderson et al. | 74—687 |

MARK M. NEWMAN, Primary Examiner

THOMAS C. PERRY, Assistant Examiner

U.S. Cl. X.R.

74—687